United States Patent
Wexler

(10) Patent No.: US 10,618,226 B2
(45) Date of Patent: Apr. 14, 2020

(54) METHOD FOR PRODUCING A BODY COMPONENT FOR A MOTOR VEHICLE, DEVICE FOR PRODUCING A BODY COMPONENT FOR A MOTOR VEHICLE AND BODY COMPONENT FOR A MOTOR VEHICLE

(71) Applicant: EuWe Eugen Wexler Holding GmbH & Co. KG, Lauf a. d. Pegnitz (DE)

(72) Inventor: Matthias Wolfgang Wexler, Rückersdorf (DE)

(73) Assignee: EuWe Eugen Wexler Holding GmbH & Co. KG, Lauf a.d. Pegnitz (DE)

( * ) Notice: Subject to any disclaimer, the term of this patent is extended or adjusted under 35 U.S.C. 154(b) by 477 days.

(21) Appl. No.: 15/533,641

(22) PCT Filed: Nov. 12, 2015

(86) PCT No.: PCT/EP2015/076434
§ 371 (c)(1),
(2) Date: Jun. 6, 2017

(87) PCT Pub. No.: WO2016/096266
PCT Pub. Date: Jun. 23, 2016

(65) Prior Publication Data
US 2017/0334148 A1    Nov. 23, 2017

(30) Foreign Application Priority Data
Dec. 16, 2014   (DE) .................. 10 2014 118 733

(51) Int. Cl.
*B29C 69/00*   (2006.01)
*B29C 70/00*   (2006.01)
(Continued)

(52) U.S. Cl.
CPC ............ *B29C 69/001* (2013.01); *B29C 69/00* (2013.01); *B29C 70/46* (2013.01); *B29C 70/545* (2013.01);
(Continued)

(58) Field of Classification Search
CPC ....... B29C 69/00; B29C 69/001; B29C 70/00; B29C 70/40; B29C 70/46; B29C 70/50;
(Continued)

(56) References Cited

U.S. PATENT DOCUMENTS

| | | | |
|---|---|---|---|
| 6,273,127 B1 * | 8/2001 | Wade ..................... | B60H 1/249 137/512.15 |
| 8,821,224 B2 * | 9/2014 | Alexander ............. | B60H 1/249 454/162 |
| 9,597,945 B2 * | 3/2017 | Maranville ........ | B60H 1/00742 |

FOREIGN PATENT DOCUMENTS

| | | |
|---|---|---|
| DE | 19838689 A1 | 3/2000 |
| DE | 102004061035 A1 | 6/2006 |

(Continued)

*Primary Examiner* — Jacob T Minskey
*Assistant Examiner* — Matthew Hoover
(74) *Attorney, Agent, or Firm* — Rimon, P.C.

(57) ABSTRACT

The invention relates to a method for producing a body component (1) for a motor vehicle (2), said body component (1) being made of a main body (3), formed from a batt that is embedded in a plastics matrix, and comprising at least one air-removal device (4), in particular for removing air from an interior (5) of the motor vehicle (2). The air-removal device (4) comprises at least one ventilation opening (7) that can be reversibly sealed by means of at least one ventilation flap element (6).

19 Claims, 4 Drawing Sheets

Figure 1:
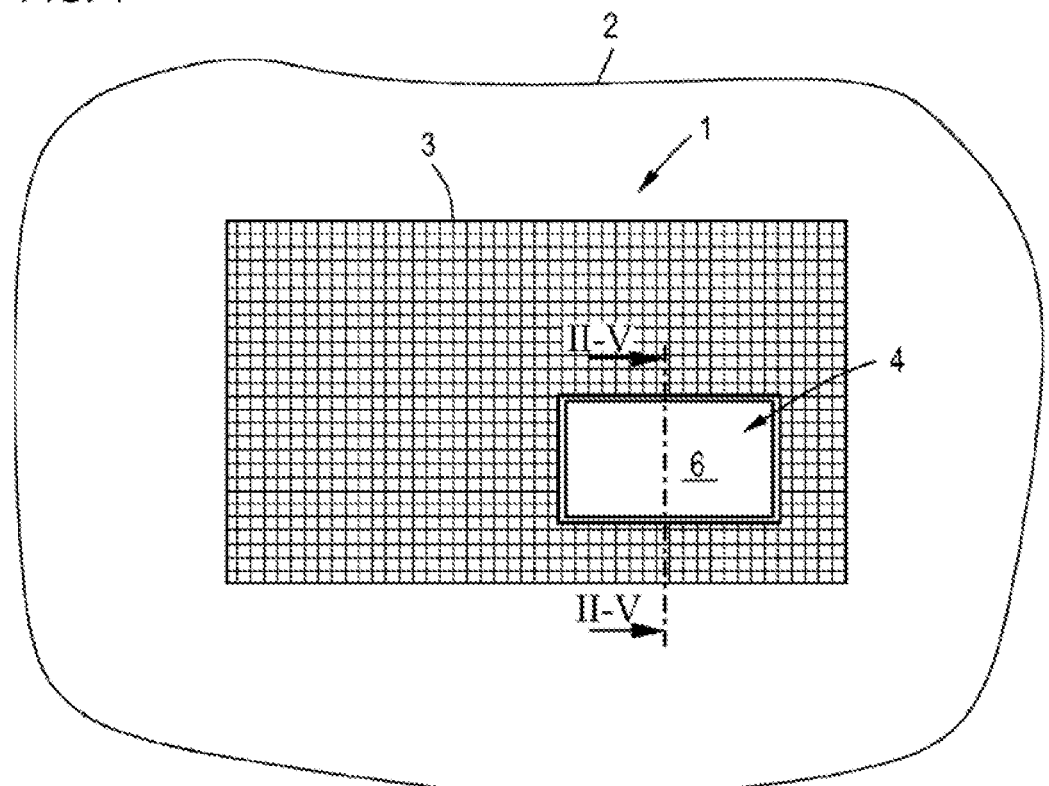

(51) Int. Cl.
*B60H 1/00* (2006.01)
*B29C 70/46* (2006.01)
*B29C 70/54* (2006.01)
*B60H 1/24* (2006.01)
B29L 31/30 (2006.01)
B29K 101/12 (2006.01)
B29K 105/00 (2006.01)

(52) U.S. Cl.
CPC ...... *B60H 1/249* (2013.01); *B29C 2793/0045* (2013.01); *B29K 2101/12* (2013.01); *B29K 2105/256* (2013.01); *B29L 2031/3032* (2013.01); *B29L 2031/3055* (2013.01)

(58) Field of Classification Search
CPC ......... B29C 70/54; B29C 70/545; B60H 1/00; B60H 1/20; B60H 1/24; B60H 1/249
See application file for complete search history.

(56) References Cited

FOREIGN PATENT DOCUMENTS

| | | |
|---|---|---|
| DE | 102011110747 A1 | 3/2012 |
| DE | 102013207872 A1 | 10/2014 |
| FR | 2792869 A1 | 11/2000 |

\* cited by examiner

METHOD FOR PRODUCING A BODY COMPONENT FOR A MOTOR VEHICLE, DEVICE FOR PRODUCING A BODY COMPONENT FOR A MOTOR VEHICLE AND BODY COMPONENT FOR A MOTOR VEHICLE

CROSS-REFERENCE TO RELATED APPLICATIONS

This application is a United States national stage entry of an International Application serial no. PCT/EP2015/076434 filed Nov. 12, 2015 which claims priority to German Patent Application serial no. 10 2014 118 733.4 filed Dec. 16, 2014. The contents of these applications are incorporated herein by reference in their entirety as if set forth verbatim.

The invention relates to a method for producing a body component for a motor vehicle, which body component is formed from a main body, formed from a non-crimp fabric embedded in a plastics matrix, and comprises at least one vent device, in particular for releasing air from an interior of the motor vehicle, which vent device comprises at least one vent opening that can be reversibly closed by means of at least one vent flap element.

There is a known practice of making modern motor vehicles at least in sections or in part from a fiber composite or composite material formed from a non-crimp fabric embedded in a plastics matrix. In recent times, corresponding fiber composite or composite materials are also being used to form parts of the vehicle body, and therefore certain body components are formed from corresponding fiber composite or composite materials.

So far, attaching vent devices that are known per se, which are typically used to release air from an interior of the motor vehicle, to body components formed from composite materials is a relatively expensive process. In respect of the attachment of corresponding vent devices to corresponding body components, there is therefore a need for development. In particular, there is a requirement for a method of attaching or forming corresponding vent devices on corresponding body components which is capable of a high degree of integration or is highly integrated and is reliable in terms of manufacturing and process technology.

It is the underlying object of the invention to specify a highly integrated method, and one which is reliable in terms of manufacturing and process technology, for producing a body component for a motor vehicle, which body component is formed from a main body, formed from a non-crimp fabric embedded in a plastics matrix, and comprises at least one vent device, in particular for releasing air from an interior of the motor vehicle, which vent device comprises at least one vent opening that can be reversibly closed by means of at least one vent flap element.

The object is achieved by a method of the type stated at the outset, which method is distinguished by the following steps:

supplying at least one, in particular sheet-like, ply of a non-crimp fabric, embedded in a plastics matrix, for the formation of the part or a part of the main body, forming at least one opening in the main body for the formation of at least one vent opening, or supplying at least one, in particular sheet-like, ply of a non-crimp fabric, embedded in a plastics matrix and having at least one opening, for the formation of the part or a part of the main body with at least one vent opening, and attachment of at least one vent flap element to the main body in such a way that said element reversibly closes the at least one opening in the main body, at least partially, to form the vent device.

The method described herein is directed in general to the production of a body component for a motor vehicle, which is formed from a main body, formed from a non-crimp fabric embedded in a plastics matrix. The body component which is to be produced or is produced by the method is thus fundamentally a fiber composite component or composite component formed from a fiber composite material or composite material in the form of a corresponding non-crimp fabric embedded in a plastics matrix.

In general, corresponding composite materials consist of a fiber material arranged in a certain alignment and orientation in a single- or multi-ply non-crimp fabric, which material is surrounded by a thermoplastics matrix or thermosetting plastics matrix, thus being embedded in a thermoplastics matrix or thermosetting plastics matrix. Typically, glass or carbon fibers are used as fiber materials, although the use of aramid fibers is also conceivable. Of course, it is possible to use (chemically) different fiber materials in a non-crimp fabric. In general, thermoplastics materials, e.g. polyamide, polyethylene or polypropylene etc., are used as thermoplastics matrices. In general, thermosetting plastics materials, e.g. acrylates, epoxy resins, phenyl resins, polyurethanes etc., are used as thermosetting plastics matrices.

The body component which is to be produced or is produced by the method comprises at least one vent device, in particular for releasing air from an interior of the motor vehicle. Accordingly, a corresponding vent device is integrated into the body component which is to be produced or is produced by the method. A corresponding vent device comprises at least one vent opening that can be reversibly closed by means of at least one vent flap element. Reversible closure of a corresponding vent opening should be taken to mean that, when there is a corresponding pressure difference, in particular between the interior and the exterior of the motor vehicle, the vent flap element can be moved at least in part relative to the vent opening in such a way that it no longer closes said opening, thus allowing air to flow out of the interior into the exterior of the motor vehicle, typically for the purpose of compensating a corresponding pressure difference. Compensating a corresponding pressure difference is important particularly in connection with the opening and closing of doors of the motor vehicle. In the state in which it closes the vent opening associated with the vent device, a corresponding vent flap element furthermore prevents the penetration of moisture, water, dirt etc. into the interior of the motor vehicle. A corresponding vent flap element is typically formed at least in part from a soft-elastic or flexible material.

The location on the vehicle body at which the body component which is to be produced or is produced by the method is to be attached will be determined in accordance with specific functional or design requirements of a specific motor vehicle. This will also determine the specific geometric/design configuration of the body component which is to be produced or is produced by the method. Purely by way of example, attention is drawn to the possibility of attaching the body component in the region of a rear end, in particular in the region of a tailgate, of a motor vehicle or of a vehicle body region forming a rear end, in particular a tailgate, of the motor vehicle.

The method comprises the following essential steps, which are explained in greater detail below:

In a first step, at least one, in particular sheet-like, ply of a non-crimp fabric, embedded in a plastics matrix, can be supplied for the formation of the part or a part of the main body of the subsequent body component. The at least one supplied ply of the non-crimp fabric embedded in a plastics matrix is typically a sheet-like semifinished product. The at least one supplied ply of the non-crimp fabric embedded in a plastics matrix can already be made up in view of the shape and geometry of the body component to be produced, that is to say, in particular, can have corresponding geometric dimensions.

In a subsequent second step, at least one opening or aperture is formed in the main body in order to form the or at least one vent opening of the vent device of the subsequent body component. Thus, a corresponding opening formed in the main body forms a flow passage for a gas, typically air, flowing out of the interior of the motor vehicle into an exterior of the motor vehicle in connection with a release of air from the interior of the motor vehicle. The formation of a corresponding opening is typically accomplished by means of a separating process, in which at least a certain part of the main body is removed from the remaining parts of the main body, in particular by mechanical means, thereby forming a corresponding opening in the main body.

Punching and/or cutting processes, in particular, may be taken into consideration as separating processes that are expediently used in accordance with the method since it is possible by these means to form corresponding openings in a large number of different shapes and geometries in the main body in a manner which is relatively simple, efficient and precise in terms of manufacturing or process technology. In other words, the formation of the at least one opening in the main body to form at least one vent opening is expediently performed by means of at least one punching and/or cutting process. In respect of the shape or geometry of the opening(s) to be formed in the main body, polygonal, in particular rectangular, round or rounded, i.e. ellipsoidal or oval, shapes are conceivable, in particular.

The size of corresponding openings formed in the main body can be between a few millimeters and some centimeters. By way of example, a diameter range of 1 mm to 3 cm is specified for round openings. Particularly in the case of relatively small openings, i.e. openings below a diameter or edge length of 3 mm, the number and arrangement of openings should be used to ensure that the vent device is capable of functioning. A suitable arrangement for this purpose would be, for example, a matrix-type arrangement in which a multiplicity of corresponding openings is formed in a multiplicity of rows and columns, preferably close to one another.

Instead of supplying at least one, in particular sheet-like, ply of a non-crimp fabric, embedded in a plastics matrix, for the formation of the part or a part of the main body and subsequently forming at least one opening in the main body in order to form at least one vent opening, it is also possible, in a first step, to supply at least one, in particular sheet-like, ply of a non-crimp fabric embedded in a plastics matrix with at least one opening for the formation of the part or a part of the main body having at least one vent opening. In this case, it is typically possible to dispense with the separate formation of openings in the main body since a main body with corresponding openings is already being supplied. Of course, it is possible to form additional openings in a supplied, in particular sheet-like, ply of a non-crimp fabric, embedded in a plastics matrix, having at least one opening and/or to change the dimensions, that is to say, in particular, the shape and/or size, of the opening(s) originally present in the supplied ply.

In a final step of the method, at least one vent flap element is attached to the main body to form the vent device. The at least one vent flap element is attached in such a way that it reversibly closes the at least one opening in the main body, at least partially. The at least one vent flap element can be attached to the main body in such a way that it can be removed (without damage or without destruction) or cannot be removed.

From the steps described, it can be seen, as mentioned above, that the method makes it possible to achieve production of corresponding body components in a manner which is highly integrated and is reliable in terms of manufacturing and process technology. In particular, in accordance with the method, integration of a corresponding vent device into the body component which is to be produced or is produced by the method is possible in a manner which is reliable in terms of manufacturing and process technology.

In connection with the attachment of a corresponding vent flap element to the main body, there are fundamentally two different possibilities, which will be explained in greater detail below.

According to a first possibility, a corresponding vent flap element can be attached directly to the main body or can be attached directly to the main body in the manufactured state of the body component. According to a second possibility, a corresponding vent flap element can be attached indirectly to the main body, i.e. via at least one further component, or can be attached indirectly to the main body in the manufactured state of the body component. Of course, it is conceivable for vent flap elements to be attached to a main body both directly and indirectly; thus, a body component can comprise vent flap elements attached both directly and indirectly.

With a view to formation or production of the body component with the number of components reduced as far as possible, it is expedient to attach corresponding vent flap elements directly to the main body since it is thereby possible to dispense with corresponding components inserted between the main body and the respective vent flap elements.

Apart from the formation of a vent device with a (single) vent opening that can be closed reversibly by means of a (single) vent flap element, this being relatively simple functionally and structurally, it is possible to form vent devices with a plurality of vent openings.

It is accordingly possible, for example, for at least two openings separated by at least one main body section, in particular at least one web- or crosspiece-type main body section, to be formed or provided in the main body. Formation of the at least two openings, which are typically formed one above the other, one below the other or adjacent to one another, is accomplished by a separating process in such a way that a certain region of the main body remains between said openings, forming a corresponding main body section, in particular a web- or crosspiece-type main body section. Furthermore, at least one vent flap element is attached to the main body in such a way that it reversibly closes the at least two openings in the main body in a closed position, wherein it rests partially against the main body section. The at least one vent flap element can be attached in a main body edge region adjacent to one of the at least two openings in the main body, for example. Here, a corresponding main body section forms a bearing point for the at least one vent flap element, at least in the closed position of the vent flap elements, in which the vent flap element reversibly closes the vent openings.

Once again starting from the formation or provision of at least two openings in the main body which are separated by at least one main body section, in particular at least one web- or crosspiece-type main body section, it is also conceivable for a first vent flap element to be attached to the main body in such a way that it reversibly closes (only) one first opening in the main body in a closed position. Here too, the first vent flap element can be attached in a main body edge region adjacent to the first opening in the main body, for example. At least one further vent flap element is attached to the at least one main body section in such a way that it reversibly closes the at least one further opening in the main body in a closed position. Here too, the formation of the at least two openings in the main body, which are typically arranged one above the other, one below the other or adjacent to one another, is accomplished by a separating process in such a way that a certain region of the main body remains between said openings, forming a corresponding main body section, in particular a web- or crosspiece-type main body section. As a further aspect, however, a plurality of vent flap elements, each of which reversibly closes a particular opening in the main body, is attached here, rather than a single vent flap element which reversibly closes the at least two openings in the main body in a closed position. Here, a corresponding main body section can form a bearing point for the free end of the first vent flap element, at least in the closed position of a first vent flap element, in which the vent flap element reversibly closes a first vent opening. Likewise, a corresponding main body section forms an attachment point for at least one further vent flap element.

For the illustrative case of three openings in the main body, i.e. three vent openings, it is therefore possible for a first vent flap element to be attached to the main body in such a way that it reversibly closes a first opening in the main body. A second flap element is attached to a first main body section in the form of a web or crosspiece in such a way that it reversibly closes a second opening in the main body in a closed position. A third vent flap element is attached to a second main body section in the form of a web or crosspiece in such a way that it reversibly closes a third opening in the main body in a closed position. The principle derived from this can of course be extended as desired. In general, it is the case that, where a plurality of main body sections is provided, these main body sections are typically arranged or aligned in parallel.

The method of attachment of a corresponding vent flap element to the main body or to a corresponding main body section can be implemented by means of at least one positive and/or nonpositive and/or material method of attachment. In other words, a corresponding vent flap element can be attached directly to the main body or to a corresponding main body section by means of at least one positive and/or nonpositive and/or material method of attachment. Attachment of a vent flap element to the main body or to a corresponding main body section means securing the vent flap element on the main body or the main body section.

The attachment of a corresponding vent flap element to the main body or to a corresponding main body section can be accomplished by means of a material method of attachment, e.g. by molding in an injection molding process. Here, the attachment of a corresponding vent flap element can take place simultaneously with the formation of the vent flap element. As mentioned at the outset, a corresponding vent flap element is formed at least in part from a soft-elastic or flexible material. Examples of materials suitable for injection molding which have a corresponding property spectrum are thermoplastic elastomers (TPE), such as ethylene-propylene-diene rubber (EPDM). Attaching a vent flap element by molding allows increased manufacturing or process integrity.

The attachment of a corresponding vent flap element to the main body or to a corresponding main body section can be accomplished by means of a material method of attachment, including welding in a welding process, in particular in an ultrasonic welding process, generally speaking a plastics welding process. Of course, this presupposes a vent flap element which is formed at least partially from a weldable material and a main body which is at least partially weldable, this being a given especially in the case in which the plastics matrix in which the non-crimp fabric is embedded is based on a thermoplastics material. Attaching a vent flap element by welding allows attachment of a vent flap element to the main body or to a corresponding main body section in a manner which is relatively simple in terms of manufacturing or process technology and is extremely reliable.

The attachment of a corresponding vent flap element to the main body or to a corresponding main body section can be accomplished by means of a material method of attachment, including adhesive bonding in an adhesive bonding process. Attaching a vent flap element by adhesive bonding likewise allows attachment of a vent flap element to the main body or to a corresponding main body section in a manner which is relatively simple in terms of manufacturing or process technology and is extremely reliable.

One example that may be considered as a possible non-positive and/or positive method of attachment of a corresponding vent flap element to the main body or to a corresponding main body section is stamping in a stamping process. It is possible, in particular, to use hot stamping, ultrasonic stamping, compression injection molding (as a hybrid of an injection molding and a stamping process) etc. as corresponding stamping processes. Stamping processes also allow attachment of a vent flap element to the main body or to a corresponding main body section in a manner which is relatively simple in terms of manufacturing or process technology and is extremely reliable.

Riveting in a riveting process may also be considered as a possible nonpositive and/or positive method of attachment of a corresponding vent flap element to the main body or to a corresponding main body section. Hot riveting, for example, can be used as a corresponding riveting process, and this once again allows attachment of a vent flap element to the main body or to a corresponding main body section in a manner which is relatively simple in terms of manufacturing or process technology and is extremely reliable.

Latching or clipping in a latching process may furthermore also be considered as a possible nonpositive and/or positive method of attachment of a corresponding vent flap element to the main body or to a corresponding main body section. In this case, corresponding latching/snap-in elements, that is to say, for example, projections or sockets, in particular at least partially undercut sockets, are present on the main body and on the vent flap element, and these can interact to form a latching/snap-in joint and thus likewise allow extremely reliable attachment of a vent flap element to the main body or to a corresponding main body section.

Of course, several different methods of attachment can be combined, e.g. in order to allow particularly stable attachment of a corresponding vent flap element to the main body or to a corresponding main body section.

The abovementioned possibility of indirect attachment of a corresponding vent flap element to the main body can be implemented, for example, by attaching at least one vent flap element to the main body indirectly via at least one frame structure in the sense of a component inserted in an appropriate manner between the vent flap element and the main body. In this case, the starting point is typically at least one, in particular sheet-like, ply consisting of a non-crimp fabric, embedded in a thermoplastics matrix, for the formation of the part or a part of the main body. A corresponding frame structure is attached at, in or in the region of an opening in the main body. At least one vent flap element is attached to the frame structure. A corresponding frame structure comprises at least one frame section, in particular at least one web- or crosspiece-type frame section, and at least one aperture forming part of the vent opening associated with the vent device.

Here too, in addition to the relatively simple design of a vent device in terms of functioning or construction, said device having a (single) aperture or vent opening in the frame structure that can be reversibly closed by means of a (single) vent flap element, it is possible to form vent devices with a plurality of apertures or vent openings in the frame structure.

Accordingly, therefore, at least two apertures in the frame structure, which are separated by at least one frame section, in particular at least one web- or crosspiece-type frame section, and corresponding openings in the main body can be provided, for example. Furthermore, at least one vent flap element is attached to the frame structure in such a way that it reversibly closes the at least two apertures in the frame structure and the openings in the main body in a closed position, wherein it rests partially on the frame section. The at least one vent flap element can be attached in a frame structure edge region adjacent to one of the at least two apertures in the frame structure, for example. Here, a corresponding frame section forms a bearing point for the at least one vent flap element, at least in the closed position of the vent flap element, in which the vent flap element reversibly closes the apertures in the frame structure and the vent openings.

Once again starting from the formation of at least two apertures in the frame structure, which are separated by at least one frame section, in particular at least one web- or crosspiece-type frame section, it is also conceivable for a first vent flap element to be attached to the frame structure in such a way that it reversibly closes (only) a first aperture in the frame structure in a closed position. Here too, the first vent flap element can be attached in a frame structure edge region adjacent to the first aperture in the frame structure, for example. At least one further vent flap element is attached to the at least one frame section in such a way that it reversibly closes the at least one further aperture in the frame structure in a closed position. Here, therefore, it is likewise a plurality of vent flap elements, which each reversibly close a particular aperture in the frame structure, which is attached, rather than a single vent flap element which reversibly closes the at least two apertures in the frame structure in a closed position. Here, a corresponding frame section can form a bearing point for the free end of the first vent flap element, at least in the closed position of a first vent flap element, in which the vent flap element reversibly closes an aperture in the frame structure or a first vent opening. Likewise, a corresponding frame section forms an attachment point for at least one further vent flap element.

Here too, the method of attachment of a corresponding vent flap element to a corresponding frame structure or a corresponding frame section can be implemented by means of at least one positive and/or nonpositive and/or material method of attachment. In other words, a corresponding vent flap element can be attached to the frame structure or to a corresponding frame section by means of at least one positive and/or nonpositive and/or material method of attachment. Attachment of a vent flap element to the frame structure or to a corresponding frame section means securing the vent flap element on the frame structure or the frame section.

A similar statement applies to the attachment of a corresponding frame structure to the main body. Thus, the attachment of the at least one frame structure to the main body can likewise be accomplished by means of at least one positive and/or nonpositive and/or material method of attachment.

Both in connection with the attachment of a corresponding vent flap element to a corresponding frame structure or a corresponding frame section and in connection with the attachment of a corresponding frame structure to the main body, the statements made in connection with the direct attachment of a corresponding vent flap element to the main body or to a main body section apply mutatis mutandis. Here too, therefore, attachment by molding, welding, adhesive bonding, stamping, riveting or latching/clipping can be used, for example.

In all cases, a corresponding vent flap element can have two functionally different regions, namely an attachment region and a flap region. In connection with the direct attachment of a corresponding a vent flap element to the main body, a vent flap element can thus be provided with an attachment region for attachment of the vent flap element to the main body or to a corresponding main body section, and a flap region for the reversible closure of the at least one or of at least one opening in the main body. In this case, the vent flap element is attached positively and/or nonpositively and/or materially to the main body or to a corresponding main body section by means of the at least one attachment region in such a way that it at least partially closes the at least one opening in the main body by means of the flap region. While the flap region is typically formed from a soft-elastic or flexible material, e.g. a TPE, the attachment region is typically formed from a stiff or rigid material, e.g. a thermoplastics material, e.g. PA, PE, PP.

In corresponding fashion, it is possible, in connection with the indirect attachment of a corresponding vent flap element to a frame structure, to provide a vent flap element having an attachment region for attachment of the vent flap element to the frame structure or to a corresponding frame section and having a flap region for the reversible closure of the at least one or of at least one aperture in the frame structure. In this case, the vent flap element is attached positively and/or nonpositively and/or materially to the frame structure or to a corresponding frame section by means of the at least one attachment region in such a way that it at least partially closes the at least one aperture in the frame structure by means of the flap region. Here too, the flap region is typically formed from a soft-elastic or flexible material, e.g. a TPE, and the attachment region is typically formed from a stiff or rigid material, e.g. a thermoplastics material, e.g. PA, PE, PP.

Further embodiments of the method, which are advantageous particularly in terms of manufacturing or process technology, are described below.

It is possible, for example, before, after or together with the formation of the at least one opening in the main body to form the at least one vent opening, to perform or carry out at least one finishing process for finishing the at least one supplied ply of the non-crimp fabric embedded in a plastics matrix to give a shape corresponding to the body component to be produced or suitable for the production thereof. As mentioned above, it is admittedly possible that the at least one supplied ply of the non-crimp fabric embedded in a plastics matrix is already finished in view of the shape and geometry of the body component to be produced, that is to say, in particular, has corresponding geometric dimensions. However, this is not absolutely essential since a corresponding finishing process can, in particular, also be performed simultaneously with the formation of the openings in the main body. In other words, it is possible, in at least one common process, both for the openings to be formed in the main body, if not originally present in the main body, and for a corresponding process of finishing the main body or the at least one supplied ply of the non-crimp fabric embedded in a plastics matrix to give a shape corresponding to the body component to be produced or suitable for the production thereof to be carried out. This can be accomplished, for example, by means of punching or cutting processes mentioned above in connection with the formation of corresponding openings in the main body. Of course, it is also possible in principle to perform a corresponding finishing process before or after the formation of corresponding openings in the main body.

It is furthermore possible that, before, after or together with the formation of the at least one opening in the main body to form the at least one vent opening, at least one forming process is performed or carried out on the main body, in particular to give it a three-dimensional component geometry corresponding to the body component to be produced. It is therefore possible, in at least one common process, both for the openings to be formed in the main body, if not originally present in the main body, and for a process of shaping the main body or the at least one supplied ply of the non-crimp fabric embedded in a plastics matrix into a three-dimensional component geometry corresponding to the body component to be produced to be carried out. The latter process can be accomplished, for example, by means of simultaneous forming processes, e.g. bending, deep drawing, pressing etc. Of course, it is also possible in principle to perform a corresponding shaping process before or after the formation of corresponding openings in the main body.

It is furthermore possible that, before, after or together with the formation of the at least one opening in the main body to form the at least one vent opening, heating of the main body, at least in part, is performed or carried out. Heating the main body can make it easier to form corresponding openings since the plastics matrix is made to soften owing to the heat input. Likewise, heating the main body can result in a reduction of mechanical stresses in the main body caused by forming, for example. Here, the heating temperature should, in principle, be chosen in accordance with the chemical and/or physical properties of the plastics matrix in order to avoid structural damage to the plastics matrix due to an excessive temperature input. In the case of a plastics matrix formed from an (amorphous) thermoplastics material, the heating temperature should be in the region of or slightly above a glass transition temperature of the plastics material. The heating can be achieved by energy-intensive radiation, in particular infrared radiation, or by suitable temperature control of the device or units used to carry out the method, for example.

The invention furthermore relates to a device for producing a body component for a motor vehicle, which body component is formed from a main body, formed from a non-crimp fabric embedded in a plastics matrix, and comprises at least one vent device, in particular for releasing air from an interior of the motor vehicle, which vent device comprises at least one vent opening that can be reversibly closed by means of at least one vent flap element. The device comprises:

at least one (first) unit for supplying at least one, in particular sheet-like, ply of a non-crimp fabric, embedded in a plastics matrix, for the formation of the part or a part of the main body, and for the formation of at least one opening in at least one supplied, in particular sheet-like, ply of a non-crimp fabric, embedded in a plastics matrix, for the formation of the part or a part of the main body or a main body of the body component, or at least one (first) unit for supplying at least one, in particular sheet-like, ply of a non-crimp fabric, embedded in a plastics matrix and having at least one opening, for the formation of the part or a part of the main body of the body component with at least one vent opening, and at least one (second) unit for the attachment of at least one vent flap element to the main body or a main body in such a way that said element reversibly closes the or at least one opening formed in the main body, at least partially, to form the vent device.

The or a first unit can be designed, for example, a conveying and/or separating unit, in particular for carrying out conveying and/or punching and/or cutting processes, or can comprise such a unit. The or a second unit can be designed, for example, as an injection molding unit, welding unit, in particular ultrasonic welding unit, adhesive bonding unit, stamping unit, in particular hot stamping unit, or riveting unit, or can comprise such a unit.

The device is designed or set up, in particular, for carrying out the method described and therefore all statements in connection with the method apply mutatis mutandis to the device.

Moreover, the invention relates to a body component produced in accordance with the method described. All the statements made in connection with the method also apply mutatis mutandis to the body component.

Further advantages, features and details of the invention will become apparent from the illustrative embodiments described below and with reference to the drawings, in which:

FIGS. 1-5 each show a schematic diagram of a body component in accordance with one embodiment of the invention; and FIGS. 6-9 each show a schematic diagram to illustrate various steps of a method in accordance with one illustrative embodiment of the invention.

FIGS. 1-5 each show a schematic diagram of a body component in accordance with one illustrative embodiment of the invention. As is apparent, FIG. 1 shows a side view of a body component 1 in a correctly installed state on a motor vehicle 2, e.g. in the region of the rear end, and FIGS. 2 to 5 each show a sectional view along section lines II-V shown in FIG. 1.

The body component 1 comprises a main body 3 consisting of a non-crimp fiber embedded in a plastics matrix. Basically, therefore, the body component 1 is a fiber composite component or composite component formed from a fiber composite material or composite material.

A corresponding composite material can be, for example, a fiber material arranged in a certain alignment and orientation in a single- or multi-ply non-crimp fabric, which material is surrounded by a thermoplastics matrix, thus being embedded in a thermoplastics matrix. Typically, glass or carbon fibers are used as fiber materials. In general, a thermoplastics material, e.g. polyamide, polyethylene or polypropylene etc. is used as a thermoplastics matrix. As an alternative to a non-crimp fabric embedded in a thermoplastics matrix, a non-crimp fabric embedded in a thermosetting plastics matrix, that is to say, for example, a plastics matrix based on an epoxy resin, would also be suitable.

The body component 1 comprises at least one vent device 4, which is used to release air from an interior 5 of the motor vehicle 2. Thus, a corresponding vent device 4 is integrated into the body component 1. A corresponding vent device 4 comprises at least one vent opening 7 that can be reversibly closed by at least one vent flap element 6. Reversible closure of a corresponding vent opening 7 should be taken to mean that, when there is an appropriate pressure difference, in particular between the interior 5 and the exterior 8 of the motor vehicle 2, the vent flap element 6 can be moved, in particular pivoted, at least partially relative to the vent opening 7 or a vent opening 7 in such a way that it no longer closes the vent opening 7, and therefore air can flow out of the interior 5 into the exterior 8 of the motor vehicle 2, typically for the purpose of compensating a corresponding pressure difference, as indicated by the arrows in FIG. 2. A corresponding vent flap element 6 is formed at least in part from a soft-elastic or flexible material, e.g. a thermoplastic elastomer.

Different possibilities for the formation of a corresponding vent device 4, that is to say especially also for the attachment of corresponding vent flap elements 6, on the main body 3 of the body component 1 can be seen from the illustrative embodiments shown in FIGS. 2 to 5. As is apparent from the illustrative embodiments shown in FIGS. 2 to 5, there are basically two different possibilities associated with the attachment of corresponding vent flap elements 6 to the main body 3.

Figure 2:
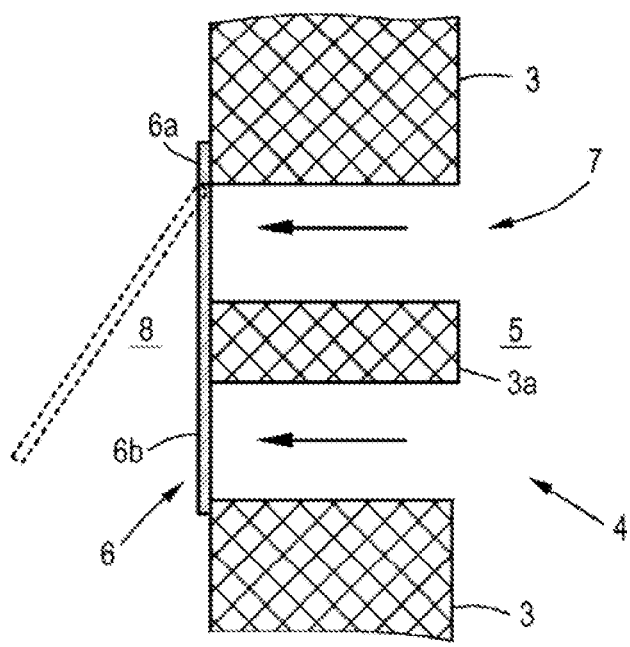
Figure 3:
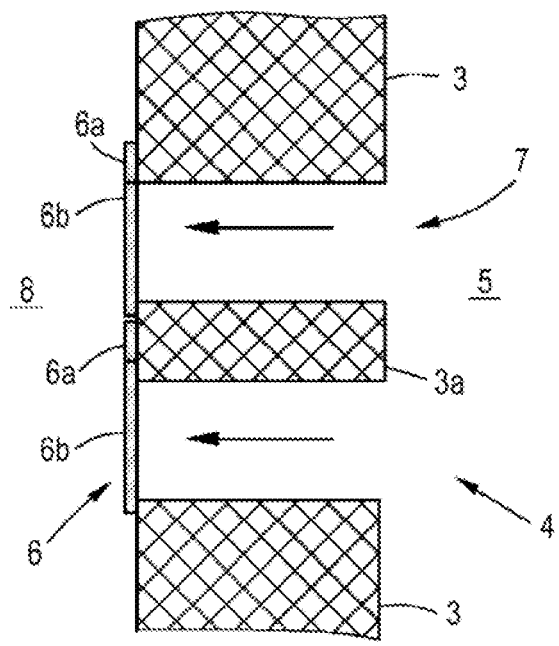

According to a first possibility, which is illustrated in the illustrative embodiments shown in FIGS. 2 and 3, corresponding vent flap elements 6 are attached directly to the main body 3 of the body component 1.

In addition to the functionally and structurally relatively simple design of a vent device 4 having a (single) vent opening 7 that can be reversibly closed by means of a (single) vent flap element 6, it is possible to form vent devices 4 with a plurality of vent openings 7.

In the illustrative embodiment shown in FIG. 2, for example, two openings or vent openings 7 separated by at least one main body section 3a, in particular at least one web- or crosspiece-type main body section, are formed in the main body 3. The formation of the at least two openings, which in this case are arranged one above the other, is accomplished by a separating process in such a way that a certain region of the main body 3 remains between said openings, forming the main body section 3a. Furthermore, a vent flap element 6 is attached to the main body 3 in such a way that it reversibly closes the at least two openings in the main body in the closed position, wherein it rests partially against the main body section 3a. The vent flap element 6 is attached in an edge region of the main body 3 adjacent to one of the at least two openings in the main body. The main body section 3a forms a bearing point for the vent flap element 6, at least in the closed position of the vent flap element 6. The open position of the vent flap element 6 is illustrated by way of example in dashed lines in FIG. 2.

In the illustrative embodiment shown in FIG. 3, two openings or vent openings 7 separated by at least one main body section 3a, in particular at least one web- or crosspiece-type main body section, are likewise formed in the main body 3. In contrast to FIG. 2, a first vent flap element 6 is attached to the main body 3 in such a way that it reversibly closes (only) a first opening in the main body in the closed position. The first vent flap element 6 is attached in an edge region of the main body 3 adjacent to the first opening in the main body. A further vent flap element 6 is attached to the at least one main body section 3a in such a way that it reversibly closes the further opening in the main body in the closed position. Here too, the formation of the two openings is accomplished by a separating process in such a way that a certain region of the main body 3 remains between said openings, forming the main body section 3a. Furthermore, in contrast to the illustrative embodiment shown in FIG. 2, however, a plurality of vent flap elements 6, which each reversibly close a particular opening in the main body, is attached, rather than a single vent flap element 6 which reversibly closes both openings in the main body. The main body section 3a forms a bearing point for the free end of the first vent flap element 6, at least in the closed position of the first vent flap element 6. Likewise, the main body section 3a forms an attachment point for the further vent flap element 6.

The method of attachment of corresponding vent flap elements 6 to the main body 3 or to a corresponding main body section 3a is implemented by means of at least one positive and/or nonpositive and/or material method of attachment. The attachment of corresponding vent flap elements 6 to the main body 3 or to a corresponding main body section 3a can be accomplished by means of a material method of attachment, e.g. by molding in an injection molding process. Here, the attachment of a corresponding vent flap element 6 can take place simultaneously with the formation of the vent flap element 6. It is expedient in this context if a corresponding vent flap element 6 is formed from a thermoplastic elastomer (TPE) suitable for injection molding, such as ethylene-propylene-diene rubber (EPDM).

Other possibilities for attaching corresponding vent flap elements 6 to the main body 3 or to a corresponding main body section 3 are mentioned above and include welding, adhesive bonding, stamping, riveting or latching/clipping, for example.

Figure 4:
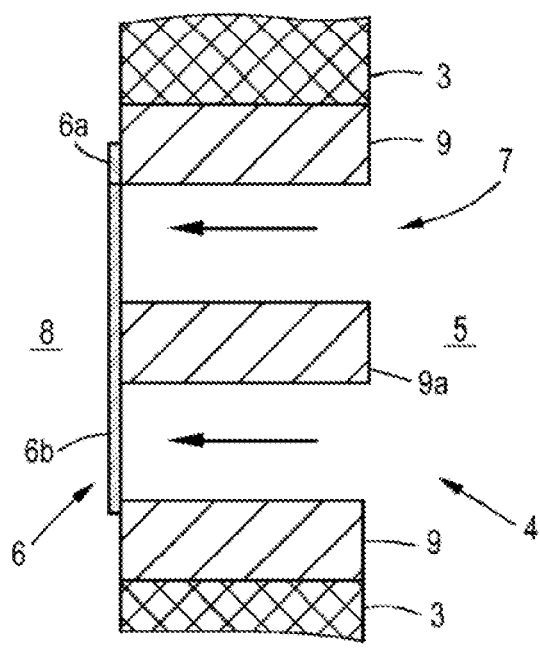
Figure 5:
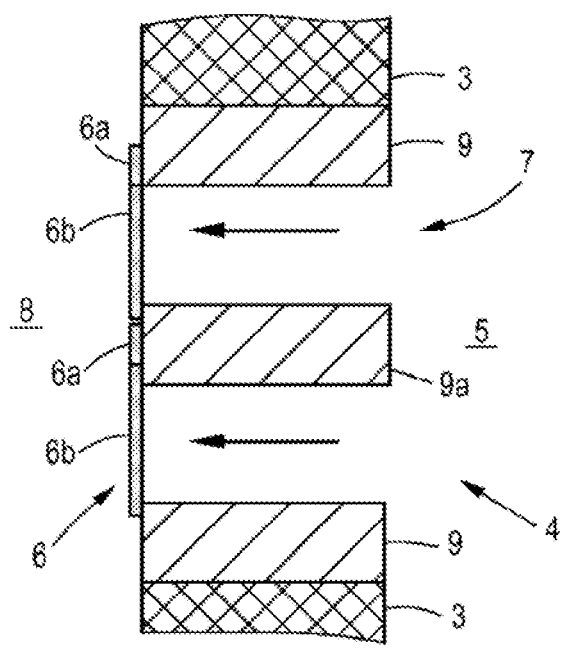

According to a second possibility, which is illustrated in the illustrative embodiments shown in FIGS. 4 and 5, a corresponding vent flap element 6 is attached indirectly, i.e. via at least one further component, to the main body 3 of the body component 1. Here, the starting point is a main body 3 formed from a non-crimp fabric embedded in a thermoplastics matrix, one based on polypropylene for example.

This is achieved by attaching corresponding air flap elements indirectly to the main body 3 via at least one frame structure 9 in the sense of a component inserted in an appropriate manner between a vent flap element 6 and the main body 3. A corresponding frame structure 9 is attached at, in or in the region of an opening in the main body. At least one vent flap element 6 is attached to the frame structure 9. A corresponding frame structure 9 comprises at least one frame section 9a in the form of a web or crosspiece and at least one aperture 10 forming part of the vent opening 7 associated with the vent device.

Here too, in addition to the functionally and structurally relatively simple design of a vent device 4 having a (single) aperture 10 or vent opening 7 in the frame structure that can be reversibly closed by means of a (single) vent flap element 6, it is possible to form vent devices 4 with a plurality of apertures 10 or vent openings 7 in the frame structure.

In the illustrative embodiment shown in FIG. 4, two apertures 10 in the frame structure 9, which are separated by at least one frame section 9a, in particular at least one web- or crosspiece-type frame section, and corresponding openings in the main body 3 are provided. A vent flap element 6 is attached to the frame structure 9 in such a way that it reversibly closes both apertures 10 in the frame structure and the openings in the main body in a closed position, wherein it rests partially on the frame section 9a. The vent flap element is attached in an edge region of the frame structure 9 adjacent to an aperture 10 in the frame structure. The frame section 9 forms a bearing point for the vent flap element 6, at least in the closed position of the vent flap element 6.

In the illustrative embodiment shown in FIG. 5, two apertures 10 separated by a web- or crosspiece-type frame section 9 are likewise formed in the frame structure 9. In contrast to FIG. 4, a first vent flap element 6 is attached to the frame structure 9 in such a way that it reversibly closes (only) a first aperture 10 in the frame structure in the closed position. The first vent flap element 6 is attached in an edge region of the frame structure 9 adjacent to the first aperture 10 in the frame structure. A further vent flap element 6 is attached to the at least one frame section 9a in such a way that it reversibly closes the further aperture 10 in the frame structure in the closed position. Similarly to the illustrative embodiment shown in FIG. 3, it is likewise a plurality of vent flap elements 6, which each reversibly close a particular aperture 10 in the frame structure, which is attached, rather than a single vent flap element 6 which reversibly closes both apertures 10 in the frame structure in the closed position. A corresponding frame section 9a forms a bearing point for the free end of the first vent flap element 6, at least in the closed position of the first vent flap element 6. Likewise, the frame section 9a forms an attachment point for the further vent flap element 6.

Here too, the method of attachment of corresponding vent flap elements 6 to a corresponding frame structure 9 or a corresponding frame section 9a is implemented by means of at least one positive and/or nonpositive and/or material method of attachment. A similar statement applies to the attachment of a corresponding frame structure 9 to the main body 3.

Even though illustrated only in the case of the illustrative embodiment shown in FIG. 1, corresponding vent flap elements can have two functionally different regions, namely an attachment region 6a and a flap region 6b. The attachment region 6a is used to attach the vent flap element 6 to the main body 3 or to a frame structure 9. The flap region 6b is used for the reversible closure of corresponding vent openings 7. Whereas the flap region 6b is formed from a soft-elastic or flexible material, e.g. a TPE, the attachment region 6b is formed from a stiff or rigid material, e.g. a thermoplastics material, e.g. PA, PE, PP.

An illustrative embodiment of a method for producing a corresponding body component 1 is furthermore described with reference to FIGS. 6 to 9.

Figure 6:
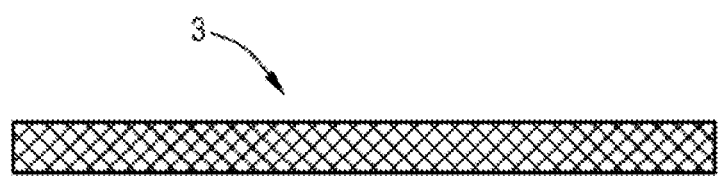

In a first step of the method, which is illustrated in FIG. 6, a semifinished product in the form of at least one sheet-like ply of a non-crimp fiber embedded in a plastics matrix is supplied for the formation of the part or a part of the main body 3 of the subsequent body component 1. The at least one supplied ply of the non-crimp fabric embedded in a plastics matrix can already be made up in view of the shape and geometry of the body component 1 to be produced, that is to say, in particular, can have corresponding geometric dimensions.

Figure 7:
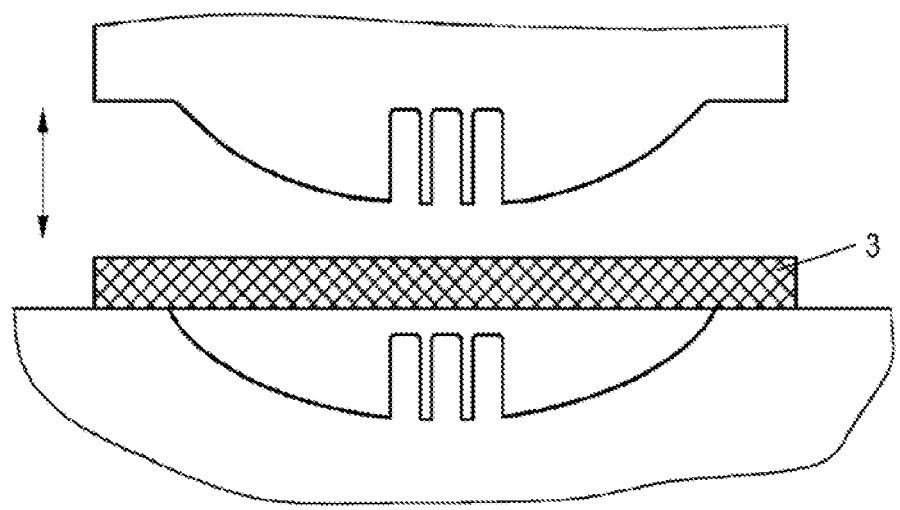
Figure 8:
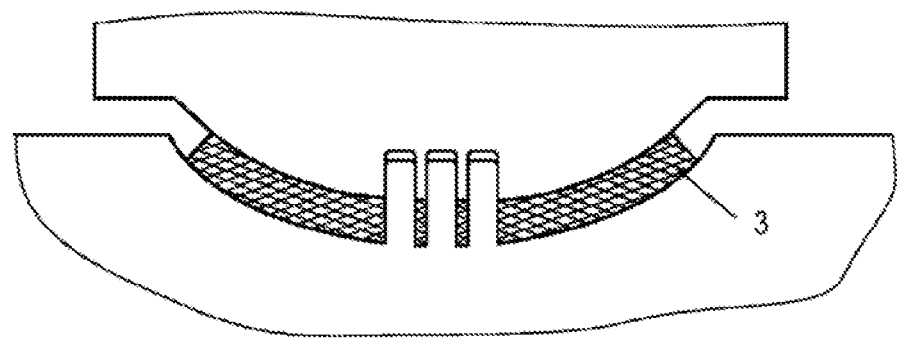

In a second step of the method, illustrated in FIGS. 7 and 8, openings or apertures are formed in the main body 3 in order to form corresponding vent openings 7 of the vent device 4 of the subsequent body component 1. Corresponding openings are formed by means of a separating process, i.e. a punching process, in which certain parts of the main body 3 are removed mechanically from remaining parts of the main body 3 to form corresponding openings in the main body. For this purpose, an essentially two-part punching tool (not denoted specifically) having spike-like punching elements formed in a lower part of the tool is used. Recesses corresponding to the spike-like punching elements are formed in the upper part of the tool. In the illustrative embodiment shown in FIGS. 7 and 8, openings with a round or rounded, i.e. ellipsoidal or oval, shape are formed in the main body 3.

The size of corresponding openings formed in the main body can be between a few millimeters and a number of centimeters. The round openings formed in FIGS. 7 and 8 can have a diameter of 1 cm, for example. Particularly in the case of relatively small openings, i.e. openings below a diameter or edge length of 3 mm, the number and arrangement of openings should be used to ensure that the vent device 4 is capable of functioning. A suitable arrangement for this purpose would be, for example, a matrix-type arrangement in which a multiplicity of corresponding openings is formed in a multiplicity of rows and columns, preferably close to one another.

Figure 9:
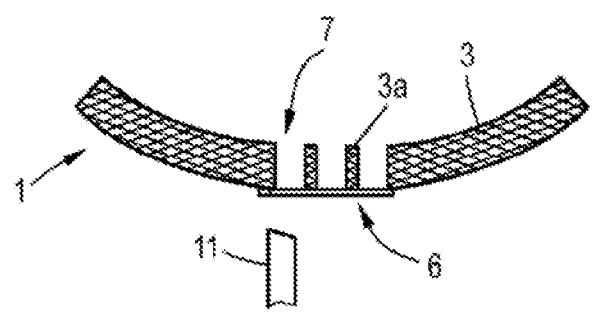

In a third step of the method, illustrated in FIG. 9, a vent flap element 6 is attached to the main body 3 to form the vent device 4. The attachment of the at least one vent flap element 6 is performed in such a way that it reversibly closes the openings formed in the main body, at least partially. The attachment of the vent flap element 6 to the main body 3 is accomplished, for example, by means of a stamping tool 11, i.e. by stamping in a stamping process. Alternative methods of attachment are mentioned above.

It can be seen from FIGS. 7 and 8 that, together with the formation of corresponding openings in the main body 3 to form corresponding vent openings 7, a forming process on the main body 3, in particular to give a three-dimensional component geometry corresponding to the body component 1 to be produced, is performed or carried out. The forming process is accomplished by means of a simultaneous forming process, e.g. deep drawing, pressing etc.

In the context of the method, it is furthermore possible that, before, after or together with the formation of corresponding openings in the main body to form corresponding vent openings 7, at least one finishing process for finishing the at least one supplied ply of the non-crimp fabric embedded in a plastics matrix to give a shape corresponding to the body component or suitable for the production thereof is performed or carried out. Simultaneous finishing can be performed, for example, by means of punching processes mentioned in connection with the formation of corresponding openings in the main body.

It is furthermore possible that, before, after or together with the formation of corresponding openings in the main body to form corresponding vent openings, heating of the main body 3, at least in part, is performed or carried out. The heating can be achieved by energy-intensive radiation, in particular infrared radiation, or by suitable temperature control of the device or units used to carry out the method, for example.

Of course, it is also possible to supply at least one, in particular sheet-like, ply of a fabric embedded in a plastics matrix, with at least one opening to form the part or a part of the main body 3 having at least one vent opening 7. In this case, it is typically possible to dispense with the separate formation of openings in the main body 3 as a main body 3 with corresponding openings is already available.

The possibility of achieving highly integrated production of corresponding body components 1 in a manner which is reliable in terms of manufacturing or process technology can be seen from the method steps described with reference to the illustrative embodiments shown in FIGS. 6 to 9. In particular, it is possible to integrate corresponding vent devices 4 into a corresponding body component 1 in a manner which is reliable in terms of manufacturing or process technology.

The method explained by means of the illustrative embodiments shown in FIGS. 6 to 9 is carried out by means of a device (not denoted specifically) for producing a corresponding body component 1. The device comprises:

at least one first unit for supplying at least one, in particular sheet-like, ply of a non-crimp fabric, embedded in a plastics matrix, for the formation of the part or a part of the main body 3, and for the formation of at least one opening in at least one supplied, in particular sheet-like, ply of a non-crimp fabric, embedded in a plastics matrix, for the formation of the part or a part of the main body 3 or a main body 3 of the body component 1, or at least one first unit for supplying at least one, in particular sheet-like, ply of a non-crimp fabric, embedded in a plastics matrix and having at least one opening, for the formation of the part or a part of the main body 3 of the body component 1 with at least one vent opening 7, and at least one second unit, e.g. an injection molding unit or a stamping unit, for the attachment of at least one vent flap element 6 to the main body 3 or a main body 3 in such a way that said element reversibly closes the or at least one opening formed in the main body, at least partially, to form the vent device 4.

To form at least one opening in at least one supplied, in particular sheet-like, ply of a non-crimp fabric, embedded in a plastics matrix, for the formation of the part or a part of the main body 3 or a main body 3 of the body component 1, the first unit can comprise a punching/bending unit, for example.

For the attachment of at least one vent flap element 6 to the main body 3 or a main body 3 in such a way that said main body at least partially closes the or at least one opening formed in the main body to form the vent device 4, the second unit can comprise an injection molding unit or a stamping unit.

The invention claimed is:

1. A method for producing a body component (1) for a motor vehicle (2), which body component (1) is formed from a main body (3), formed from a non-crimp fabric embedded in a plastics matrix, and comprises at least one vent device (4), in particular for releasing air from an interior (5) of the motor vehicle (2), which vent device (4) comprises at least one vent opening (7) that can be reversibly closed by means of at least one vent flap element (6), wherein the method comprises the following steps:

supplying at least one, in particular sheet-like, ply of a non-crimp fabric, embedded in a plastics matrix, for the formation of the part or a part of the main body (3), forming at least one opening in the main body (3) for the formation of at least one vent opening (7), or supplying at least one, in particular sheet-like, ply of a non-crimp fabric, embedded in a plastics matrix and having at least one opening, for the formation of the part or a part of the main body (3) with at least one vent opening (7), and attachment of at least one vent flap element (6) to the main body (3) in such a way that said element reversibly closes the at least one opening in the main body, at least partially, to form the vent device (4).

2. The method as claimed in claim 1, characterized in that the at least one or at least one vent flap element (6) is attached directly to the main body (3).

3. The method as claimed in claim 2, characterized in that at least two openings are formed or provided in the main body (3), said openings being separated by at least one main body section (3a), in particular at least one web- or crosspiece-type main body section, and at least one vent flap element (6) is attached to the main body (3) in such a way that it reversibly closes the at least two openings in the main body in a closed position, wherein it rests partially on the main body section (3a).

4. The method as claimed in claim 2, characterized in that at least two openings are formed or provided in the main body (3), said openings being separated by at least one main body section (3a), in particular at least one web- or crosspiece-type main body section, and a first vent flap element (6) is attached to the main body (3) in such a way that it reversibly closes a first opening in the main body in a closed position, and at least one further vent flap element (6) is attached to the at least one main body section (3a) in such a way that it reversibly closes the at least one further opening in the main body in a closed position.

5. The method as claimed in claim 2, characterized in that at least one vent flap element (6) is attached directly to the main body (3) or to a corresponding main body section (3a) by means of at least one positive and/or nonpositive and/or material method of attachment.

6. The method as claimed in claim 5, characterized in that the attachment of the at least one or of at least one vent flap element (5) to the main body (3) or to a corresponding main body section (3a) is accomplished by means of a material method of attachment, by molding in an injection molding process, by welding in a welding process, in particular an ultrasonic welding process, by adhesive bonding in an adhesive bonding process, or nonpositively and/or positively by stamping in a stamping process, riveting in a riveting process or latching in a latching process.

7. The method as claimed in claim 1, characterized in that at least one vent flap element (6) is attached indirectly to the main body (3) via at least one frame structure (9), wherein the at least one frame structure (9) comprises at least one frame section (9a), in particular at least one web- or crosspiece-type frame section, and an aperture (10) forming part of a vent opening (7) associated with the vent device.

8. The method as claimed in claim 7, characterized in that at least one, in particular sheet-like, ply of a non-crimp fabric embedded in a thermoplastics matrix is used to form the part or a part of the main body (3).

9. The method as claimed in claim 7, characterized in that the attachment of the at least one frame structure (9) to the main body (3) is accomplished by means of at least one positive and/or nonpositive and/or material method of attachment.

10. The method as claimed in claim 7, characterized in that the attachment of the at least one frame structure (9) to the main body (3) is accomplished by means of a material method of attachment, by molding in an injection molding process, by welding in a welding process, in particular an ultrasonic welding process, by adhesive bonding in an adhesive bonding process, or nonpositively and/or positively by stamping in a stamping process, riveting in a riveting process or latching in a latching process.

11. The method as claimed in claim 1, characterized in that a vent flap element (6) having an attachment region (6a) for attachment of the vent flap element (6) to the main body (3) or to a corresponding main body section (3a), and having a flap region (6b) for the reversible closure of the at least one or of at least one opening in the main body is provided, wherein the vent flap element (6) is attached to the main body (3) or to a corresponding main body section (3a) by means of the at least one attachment region (6a) in such a way that it at least partially closes the at least one opening formed in the main body by means of the flap region (6b), or in that a vent flap element (6) having an attachment region (6a) for attachment of the vent flap element (6) to the or to a frame structure (9) and having a flap region (6b) for the reversible closure of the at least one or of at least one aperture (10) in the frame structure is provided, wherein the vent flap element (6) is attached to the frame structure (9) by means of the at least one attachment region (6a) in such a way that it at least partially closes the at least one aperture (10) in the frame structure by means of the flap region (6b).

12. The method as claimed in claim 1, characterized in that, before, after or together with the formation of the at least one opening in the main body (3) to form the at least one vent opening (7), at least one finishing process for finishing the at least one supplied ply of the non-crimp fabric embedded in a plastics matrix to give a shape corresponding to the body component (1) or suitable for the production thereof is performed.

13. The method as claimed in claim 1, characterized in that, before, after or together with the formation of the at least one opening in the main body (3) to form the at least one vent opening (7), at least one forming process is performed on the main body (3), in particular to give it a three-dimensional component geometry corresponding to the body component (1) to be produced.

14. The method as claimed in claim 1, characterized in that, before, after or together with the formation of the at least one opening in the main body (3) to form the at least one vent opening (7), heating of the main body, (3) at least in part, is performed.

15. The method as claimed in claim 1, characterized in that the formation of the at least one opening in the main body (3) to form at least one vent opening (7) is performed by means of at least one punching and/or cutting process.

16. The method as claimed in claim 1, characterized in that at least one, in particular sheet-like, ply of a non-crimp fabric embedded in a thermoplastics matrix or thermosetting plastics matrix is used to form the part or a part of the main body (3).

17. The method as claimed in claim 1, characterized in that at least one opening having a polygonal, in particular rectangular, round or rounded shape is formed in the main body (3).

18. A device for producing a body component (1) for a motor vehicle (2), which body component (1) is formed from a main body (3), formed from a non-crimp fabric embedded in a plastics matrix, and comprises at least one vent device (4), in particular for releasing air from an interior (5) of the motor vehicle (2), which vent device (4) comprises at least one vent opening (7) that can be reversibly closed by means of at least one vent flap element (6), wherein the device comprises:

at least one unit for supplying at least one, in particular sheet-like, ply of a non-crimp fabric, embedded in a plastics matrix, for the formation of the part or a part of the main body (3), and for the formation of at least one opening in at least one supplied, in particular sheet-like, ply of a non-crimp fabric, embedded in a plastics matrix, for the formation of the part or a part of the main body (3) or a main body (3) of the body component (1), or at least one unit for supplying at least one, in particular sheet-like, ply of a non-crimp fabric, embedded in a plastics matrix and having at least one opening, for the formation of the part or a part of the main body (3) of the body component (1) with at least one vent opening (7), and at least one unit for the attachment of at least one vent flap element (6) to the main body (3) or a main body (3) in such a way that said element reversibly closes the or at least one opening in the main body, at least partially, to form the vent device (4).

19. A body component (1) produced in accordance with a method as claimed in claim 1.

* * * * *